May 14, 1935.     B. J. UKROPINA     2,001,041
REENFORCED CONCRETE PIPE JOINT
Filed July 10, 1933
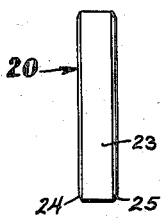
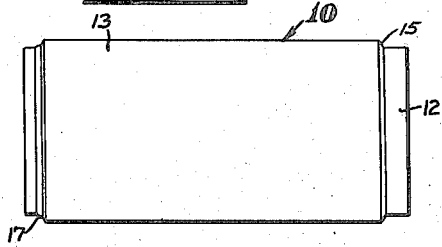
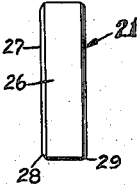
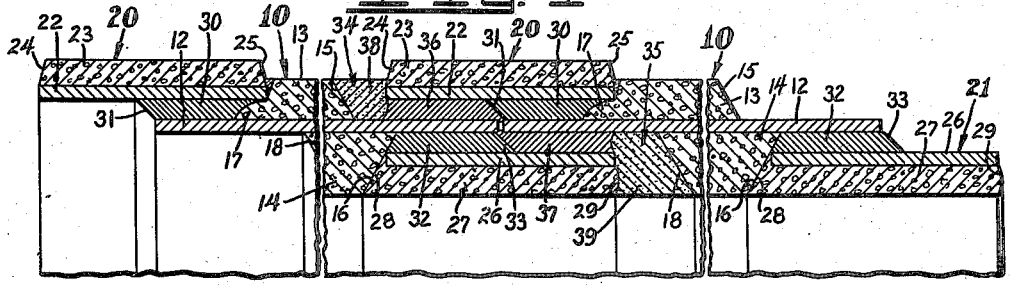
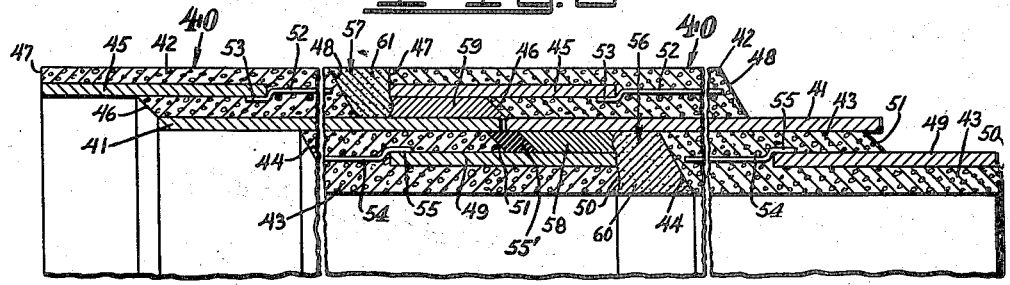
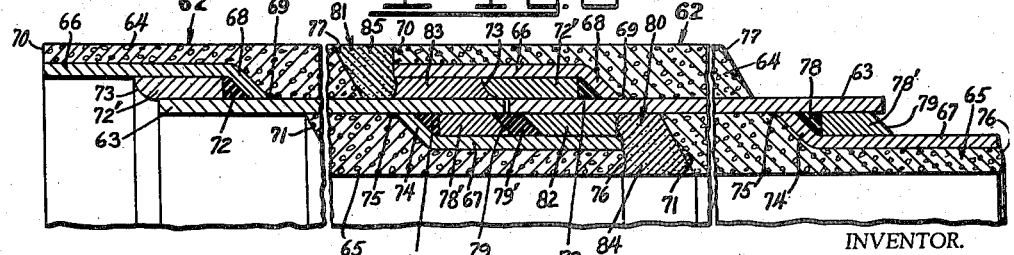
INVENTOR.
B.J. UKROPINA.
BY
ATTORNEY.

Patented May 14, 1935

2,001,041

UNITED STATES PATENT OFFICE 2,001,041

REENFORCED CONCRETE PIPE JOINT

Bozidar J. Ukropina, Los Angeles, Calif.

Application July 10, 1933, Serial No. 679,723

2 Claims. (Cl. 72—53)

This invention relates to improvements in concrete pipes.

The general object of the invention is to provide an improved concrete pipe joint for connecting two lengths of pipe.

Another object of the invention is to provide a bell and spigot pipe joint construction which may be caulked from the inside as well as from the outside.

A further object of the invention is to provide a novel joint for connecting two lengths of concrete pipe wherein the pipes include a metal cylinder embedded therein and wherein the joint includes means for packing on both sides of the metal cylinders.

Other objects and the advantages of this invention will be apparent from the following description taken in connection with the accompanying drawing wherein:

Fig. 1 is a side elevation of a length of concrete pipe embodying the features of my invention;

Fig. 2 is a side elevation of the inner collar member used in forming a joint between two lengths of pipe;

Fig. 3 is a view similar to Fig. 2 showing the outer collar member;

Fig. 4 is an enlarged fragmentary section through two lengths of the pipe shown in Fig. 1 showing details of my improved joint construction;

Fig. 5 is a view similar to Fig. 4 showing a modified form of pipe and joint; and, Fig. 6 is a view similar to Fig. 4 showing a further modified form of pipe and pipe joint.

Referring to the drawing by reference characters I have indicated a length of pipe embodying the features of my invention generally at 10. As shown the pipe 10 comprises a metal reenforcing cylinder 12 embedded between an outer layer of concrete 13 and an inner layer of concrete 14. At one end of the pipe which I shall call the spigot end the outer layer of concrete 13 is set back from the adjacent end of the cylinder 12 as at 15 and the inner layer of concrete 14 is set back from the adjacent end of the cylinder and is preferably tapered as indicated at 16. At the opposite end of the pipe which I shall call the bell end the outer layer of concrete 13 is set back from the adjacent end of the metal cylinder 12 and includes a reduced arcuate boss portion 17. The inner layer of concrete 14 adjacent the bell end of the pipe is likewise set back from the end of the cylinder and is preferably beveled as indicated at 18.

In forming a joint between two lengths of the pipe 10 I use an outer collar member 20 which is shown in detail in Fig. 2 and an inner collar member 21 which is shown in detail in Fig. 3.

As shown the outer collar member 20 comprises a metal cylinder 22 having an outer layer of concrete 23 thereon. Each end face of the concrete 23 is preferably beveled as indicated at 24 and 25. The inside diameter of the collar 20 is approximately the same as the outside diameter of the reduced boss portion 17 of the pipe.

The inner collar member 21 comprises a metal cylinder 26 having a ring of concrete 27 therein. As shown one end face of the concrete 27 of the inner collar is beveled as at 28 and the opposite end face is arcuate as indicated at 29. The outside diameter of the collar 21 is less than the inside diameter of the cylinder 12 and the inside diameter of the collar 21 is the same size as the inside diameter of the pipe.

In forming a joint the collar 20 is positioned on the spigot end of the pipe with the end 25 of the collar positioned over the boss portion 17 of the pipe. When the collar 20 is thus positioned on the pipe the adjacent end of the pipe cylinder 12 projects into the collar to a point intermediate the length thereof. A packing material 30 such as lead is then positioned in the space between the outside of the pipe cylinder 12 and the inside of the collar cylinder 22 and is driven against the pipe boss 17. The opposite end of the packing 30 is preferably beveled outwardly from the end of the pipe cylinder 12, as indicated at 31.

The collar 21 is positioned in the spigot end of the pipe with the beveled end 28 thereof engaging the beveled end 16 of the pipe. In this position the adjacent end of the pipe cylinder 12 overlays the collar to a point intermediate the length thereof. A packing material 32 such as lead is then positioned in the space between the inside of the pipe cylinder 12 and the outside of the collar cylinder 26. The outer end of the packing 23 is preferably beveled outwardly from the end of the pipe cylinder 12, as indicated at 33.

When joining two lengths of the pipe 10 the spigot end of one pipe length is positioned in the bell end of the adjoining pipe length. In this position the collar 21 of one pipe is positioned in the bell end of the adjoining pipe and the spigot end of the one pipe is positioned in the collar 20 of the adjoining pipe. When the pipes are thus joined the end of the collar 20 is spaced from the end 15 of the pipe to form a chamber 34 and the end 29 of the collar 21 is spaced from the end 18 of the pipe to form a chamber 35.

A caulking material 36, such as lead wool, is then tightly driven into the space between the outside of the pipe cylinder 12 and the inside of the collar cylinder 22 and extends from the end 31 of the packing 30 to adjacent the end of the collar 20. A similar caulking material 37 is tightly driven into the space between the inside of the pipe cylinder 12 and the collar cylinder 26 and extends from the end 33 of the packing to adjacent the end of the collar 21. Thereafter, the chamber 34 is filled with a sealing material 38 such as a cement mortar and the chamber 35 is filled with a similar sealing material 39.

When a pipe line embodying the features of my invention expands or contracts the packing materials 31 and 32 and the caulking materials 36 and 37 may slip on both their inner and outer surfaces thereby reducing the friction on any one surface thereof.

In Fig. 5 I have indicated a modified form of concrete pipe embodying the features of my invention generally at 10. As shown the pipe 40 comprises a metal reinforcing cylinder 41 embedded between an outer layer of concrete 42 and an inner layer of concrete 43. The inner layer of concrete 43 at one end is spaced inward from the adjacent end of the cylinder 41 and is preferably beveled as at 44. Embedded in the outer layer of concrete 42 adjacent the end 44 of the pipe I provide a metal bell ring 45 which surrounds the adjacent end portion of the cylinder 41 and is spaced therefrom. The outer end of the bell ring 45 projects beyond the end of the cylinder 41 and the concrete between the cylinder 41 and the bell ring 45 is set back from the end of the cylinder 41 and is preferably beveled outwardly as indicated at 46. The concrete outside of the bell ring 45 terminates flush with the outer end of the bell ring 45 as at 47.

The outer layer of concrete 42 at the end of the pipe opposite the bell end thereof is spaced inwardly from the adjacent end of the cylinder 41 and is preferably beveled as at 48. Embedded in the inner layer of concrete 43 adjacent the end 48 of the pipe I provide a metal spigot ring 49 which is surrounded by the adjacent end portion of the cylinder 41 and is spaced therefrom. The outer end of the spigot ring 49 projects beyond the adjacent end of the cylinder 41. The concrete inside of the spigot ring 49 terminates approximately flush with the outer end of the spigot ring and is preferably arcuate as indicated at 50 and the concrete outside of the spigot ring is set back from the adjacent end of the cylinder 41 and is preferably beveled as indicated at 51.

Embedded in the outer layer of concrete 42, I preferably provide a metal reenforcing cage 52 one end of which is secured to the bell ring 45 as at 53 by welding it thereto. The opposite end of the cage 52 terminates short of the end 48 of the outer layer of concrete. Embedded in the inner layer of concrete 43 I preferably provide a similar reenforcing cage 54 one end of which is secured to the spigot ring 49 as at 55 by welding it thereto. The opposite end of the reenforcing cage 54 terminates short of the end 44 of the inner layer of concrete. Positioned on the spigot ring 49 I may provide a packing member such as a rubber ring 55'. The inner end face of the ring 55' engages the face 51 of the concrete and the outer end face of the ring 58 projects beyond the adjacent end of the cylinder 41 and is preferably beveled so that the ring 55' is compressed when the lengths are joined.

When joining two lengths of pipe 40 the spigot end of one pipe is positioned in the bell end of the adjoining pipe. In this position the end of the spigot ring is spaced from the end 44 of the adjoining pipe to provide a chamber 56 and the end 47 of the pipe is spaced from the end 48 of the adjoining pipe to form a chamber 57. The protruding portion of the cylinder 41 of the adjoining pipe overlays the protruding portion of the spigot ring while the protruding portion of the bell ring 45 overlays the cylinder 41 of the adjoining pipe. After the pipes have thus been joined a caulking material 58, such as lead wool, is tightly driven into the space between the outside of the spigot ring 49 and the inside of the pipe cylinder 41 of the adjoining pipe and extends from the packing ring 55' to approximately flush with the end of the spigot ring. A similar caulking material 59 is tightly driven into the space between the inside of the bell ring 45 and the outside of the cylinder 41 of the adjoining pipe and extends from the end 46 of the pipe to approximately flush with the end of the bell ring. Thereafter a sealing material 60, such as cement mortar, is positioned in the chamber 56 and a similar sealing material 61 is positioned in the chamber 57.

In Fig. 6 I have indicated a further modified form of concrete pipe embodying the features of my invention generally at 62. As shown the pipe 62 comprises a metal reenforcing cylinder 63 embedded between an outer layer of concrete 64 and an inner layer of concrete 65. At one end of the pipe I provide a metal bell ring 66 and at the opposite end a metal spigot ring 67. The inside diameter of the bell ring is greater than the outside diameter of the reenforcing cylinder 63 and the outside diameter of the spigot ring is less than the inside diameter of the cylinder 63. The outer end of the bell ring 66 projects beyond the adjacent end of the cylinder 63 and the inner portion of the bell ring projects inward over the cylinder 63 and is provided with an angular portion 68 which is secured to the cylinder 63 by welding as indicated at 69.

The outer layer of concrete 64 adjacent the bell end of the pipe extends over the outside of the bell ring 66 and terminates flush with the outer end thereof as indicated at 70 while the inner layer of concrete is set back from the end of the cylinder 63 and is preferably beveled as indicated at 71.

Positioned in the bell ring 66 I provide a packing member such as a rubber ring 72. The inner surface of the ring 72 engages the cylinder 63 and the outer surface engages the bell ring 66 and the inner end face of the ring 72 engages the beveled portion 68 of the bell ring.

Positioned in the space between the outside of the cylinder 63 and the inside of the bell ring 66 I provide packing material 72' such as lead which extends from the ring 72 to the adjacent end of the cylinder 63 where it is rounded outwardly as indicated at 73.

The outer end of the spigot ring 67 projects beyond the adjacent end of the cylinder 63 and the inner portion of the spigot ring projects inward from the adjacent end of the cylinder 63 where it includes an angular portion 74 which is secured to the cylinder 63 by welding as indicated at 75.

The inner layer of concrete 65 adjacent the spigot end of the pipe terminates in an arcuate face adjacent the outer end of the spigot ring as indicated at 76, while, the outer layer of concrete 64 is set back from the end of the cylinder 63 and is preferably beveled as indicated at 77.

Positioned on the spigot ring 67 I provide a packing member such as a rubber ring 78. The inner face of the ring 78 engages the spigot ring 67 and the outer face of the ring 78 engages the cylinder 63 and the inner end face of the ring 78 engages the beveled portion 74 of the spigot ring.

Positioned in the space between the inside of the reenforcing cylinder 63 and the outside of the spigot ring 67 I provide a packing material 78' such as lead which extends from the packing ring 78 to adjacent the end of the cylinder 63 where it terminates in a beveled face set back from the adjacent end of the cylinder 63 as indicated at 79.

Positioned on the spigot ring 67 I provide another packing member such as a rubber ring 79'. The inner face of the ring 79' engages the spigot ring 67 and a portion of the outer face of the ring 79' engages the cylinder 63. The inner end face of the ring 79' engages the packing material 78' and the outer end face of the ring projects beyond the adjacent end of the cylinder 63 and is preferably beveled.

When joining two lengths of the pipe 62 the spigot end of one pipe is positioned in the bell end of the adjoining pipe. When the pipes are thus positioned together the end 76 of the inner layer of concrete of one pipe is spaced from the end 71 of the inner layer of concrete of the adjoining pipe to provide a chamber 80 and the end 70 of the outer layer of concrete of the adjoining pipe to form a chamber 81. Furthermore, when the pipes are thus joined the projecting portion of the cylinder 63 of one pipe overlays the projecting portion of the spigot ring 67 of the adjoining pipe and is spaced therefrom and the projecting portion of the bell ring 66 of one pipe overlays the projecting portion of the cylinder 63 of the adjoining pipe and is spaced therefrom. It will be understood that the rings 72, 78 and 79' are compressed in the pivoted joint.

Positioned in the space between the spigot ring 67 and the cylinder 63 of the adjoining pipe I provide a caulking material 82 such as lead wool which extends from the ring 79' to approximately flush with the end of the spigot ring. Positioned in the space between the bell ring and the cylinder 63 of the adjoining pipe I provide a caulking material 83 such as lead wool which extends from the end of the spigot ring. After the caulking materials 82 and 83 have been placed in position a sealing material 84, such as cement mortar, is positioned in the chamber 80 and a similar sealing material 85 is positioned in the chamber 81.

From the foregoing description it will be apparent that I have provided a novel concrete pipe construction and a novel joint construction for connecting two lengths of the pipe which are simple in construction and highly efficient in use.

Having thus described my invention, I claim:

1. A conduit comprising a plurality of lengths of pipe positioned end to end, each of said pipe lengths including a metal reenforcing tube embedded between an outer layer of concrete and an inner layer of concrete, said inner layer of concrete at each end being set back to form an inner chamber, the outer layer of concrete at each end being set back to form an outer chamber, an inner independently formed collar member, the outer diameter of said collar being less than the inner diameter of said pipe reenforcing tube, said collar being positioned in the inner chambers at adjacent ends of said pipe lengths, joint forming material positioned in the space between the outer surface of said collar and the inner surface of said tubes, an outer independently formed collar member, the inner diameter of said outer collar being greater than the outer diameter of said pipe tubes, said outer collar being positioned in the outer chambers at adjacent ends of said pipe lengths, and joint forming material positioned in the space between the outer surface of said tubes and the inner surface of said outer collar.

2. A conduit comprising a plurality of lengths of concrete pipe positioned end to end, each of said pipe lengths including a metal reenforcing member embedded between an outer layer of concrete and an inner layer of concrete, said inner layer of concrete at each end being set back from the ends of said pipe to form an inner chamber, said outer layer of concrete at each end being set back to form an outer chamber, an inner collar member, the outer diameter of said collar member being less than the inner diameter of said pipe reenforcing member, said collar being positioned in the inner chambers at adjacent ends of said pipe lengths, a packing material positioned in the space between the outer surface of said collar and the inner surface of the reenforcing member of one of said pipes, a caulking material positioned in the space between the outer surface of said collar and the inner surface of said reenforcing member of said second pipe, said caulking material being placed in position after said second pipe is jointed to said collar, a plastic filling material positioned in said chamber, an outer collar member, the inner diameter of said outer collar member being greater than the outer diameter of said pipe reenforcing member, said outer collar being positioned in the outer chambers at adjacent ends of said pipe lengths, a packing material positioned in the space between the outer surface of said tube of one of said pipes and the inner surface of said outer collar and a caulking material positioned in the space between the outer surface of said reenforcing member of said second pipe and the inner surface of said outer collar, said caulking material being placed in position after said second pipe is joined to said outer collar.

BOZIDAR J. UKROPINA.